(12) United States Patent
Chitapur et al.

(10) Patent No.: US 8,762,304 B2
(45) Date of Patent: Jun. 24, 2014

(54) POLICY SCHEDULING

(75) Inventors: Siddalingaprabhu Amareshappa Chitapur, Karnataka (IN); Kiran Joseph Almeida, Karnataka (IN); Sridhar Bommaiah, Karnataka (IN); Veera Raghava Reddy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 899 days.

(21) Appl. No.: 12/651,765

(22) Filed: Jan. 4, 2010

(65) Prior Publication Data

US 2011/0106737 A1      May 5, 2011

(30) Foreign Application Priority Data

Nov. 3, 2009   (IN) ........................... 2672/CHE/2009

(51) Int. Cl.
  *G06F 15/18*   (2006.01)
  *G06F 21/00*   (2013.01)
  *G06F 9/46*    (2006.01)
  *G06N 5/02*    (2006.01)

(52) U.S. Cl.
  USPC .................... 706/13; 726/1; 718/102; 706/47

(58) Field of Classification Search
  None
  See application file for complete search history.

(56) References Cited

U.S. PATENT DOCUMENTS

| 7,043,462 | B2 * | 5/2006 | Jin et al. ........................ 706/13 |
| 7,979,578 | B2 * | 7/2011 | Lakshmanan et al. ........ 709/238 |
| 2004/0143559 | A1 * | 7/2004 | Ayala ............................. 706/13 |
| 2009/0319346 | A1 * | 12/2009 | Fogel et al. .................... 705/11 |

OTHER PUBLICATIONS

Whiteson and Stone, "Evolutionary Function Approximation for Reinforcement Learning", Journal of Machine Learning Research, vol. 7, 2006, pp. 877-917.*
Takadama, Kasahara, Huang, Watabe, Il, Shimohara, Nakasuka, "Organizational Learning Agents for Task Scheduling in Space Crew and Robot Operations", Proc. Fifth International Symposium on Artificial Intelligence, Robotics and Automation in Space, Jun. 1-3, 1999, (ESA SP-440), pp. 561-568.*
Timuri, Spronck and Herik, "Automatic Rule Ordering for Dynamic Scripting", Association for the Advancement of Artificial Intelligence, "http://ticc.uvt.nl/~pspronck/pubs/AIIDE07Spronck.pdf", 2007.*
Kim, Gyoung Hwan, "General Reinforcement Learning Approach to the Heterogeneous Machine Scheduling Problem", Perdue University, West Lafayette, In, 1997, pp. 1-173.*
Michie, Chambers, "Boxes: An Experiment in Adaptive Control", In Machine Intelligence 2 , (eds. E. Dale and D. Michie), Edinburgh: Oliver & Boyd, 1968, pp. 137-152.*
Watkins, Dayan, "Q-Learning", In Machine Learning, 8, 1992, pp. 279-292.*

* cited by examiner

*Primary Examiner* — Kakali Chaki
*Assistant Examiner* — Walter Hanchak

(57) ABSTRACT

A policy scheduler scheduling a policy is provided. The policy scheduler receives the policy for a system and information of a current state of the system. The policy scheduler evaluates one or more rules based on the current state of the system and generates a new rule via an evolutionary algorithm based on the information of the current state of the system. The policy scheduler adds the newly generated rule into the one or more rules and schedules the policy based on the one or more rules including the newly generated rule.

18 Claims, 7 Drawing Sheets

POLICY SCHEDULING

PRIORITY

This application claims priority under 35 U.S.C. §119 to an application filed in India on Nov. 3, 2009 and assigned Indian Patent Application No. 2672/CHE/2009, the contents of which are incorporated herein by reference.

BACKGROUND

Policies govern the management aspects of a system application. An operation manager server may provide this functionality using rules and actions embedded in what is called a policy. At any given time, policies for various system applications within the operation manager server can be in action on the system. Either these policies can be scheduled to start at the same time or their executions may be overlapping in nature. A process may be spawned for each such policy that is scheduled. The spawned process executes the policy within the system and terminates. When multiple executions overlap, a large number of policies may compete with the system application for limited system resources and may cause peak workloads on the processor and memory of the system. Such spikes in the system often result in performance downgrade of applications currently active on the system. This can give rise to very high resource, such as CPU, memory, database, contention and may eventually lead to starvation of policies, such as failing to execute due to long delays in execution of previously spawned process.

Also, customers may use custom policies created using an operation manager server to address their own monitoring requirements. Therefore, schedule conflicts can be seen between the custom policies and the ones originally provided. The same issue takes a broader spectrum when the customers use system applications from multiple vendors. The existing applications load on the system also impacts execution of policies. The execution behavior of policies can be dependent on factors, such as whether the system is servicing peak business hours or off peak time. Any static analysis/modifications of policy schedules do not resolve the associated issues.

The issue becomes significant with the increase in the number of policies being executed on the system. Parallel execution of the policies may result in the system experiencing peak workload that causes a hampering of other applications that are running on the same system. Considering the volume of policies and the dynamic nature of the systems, therefore, the parallel execution of the policies is largely time consuming and error prone.

BRIEF DESCRIPTION OF THE DRAWINGS

Features of the present invention will become apparent to those skilled in the art from the following description with reference to the figures, in which.

DETAILED DESCRIPTION

Figure 1A:
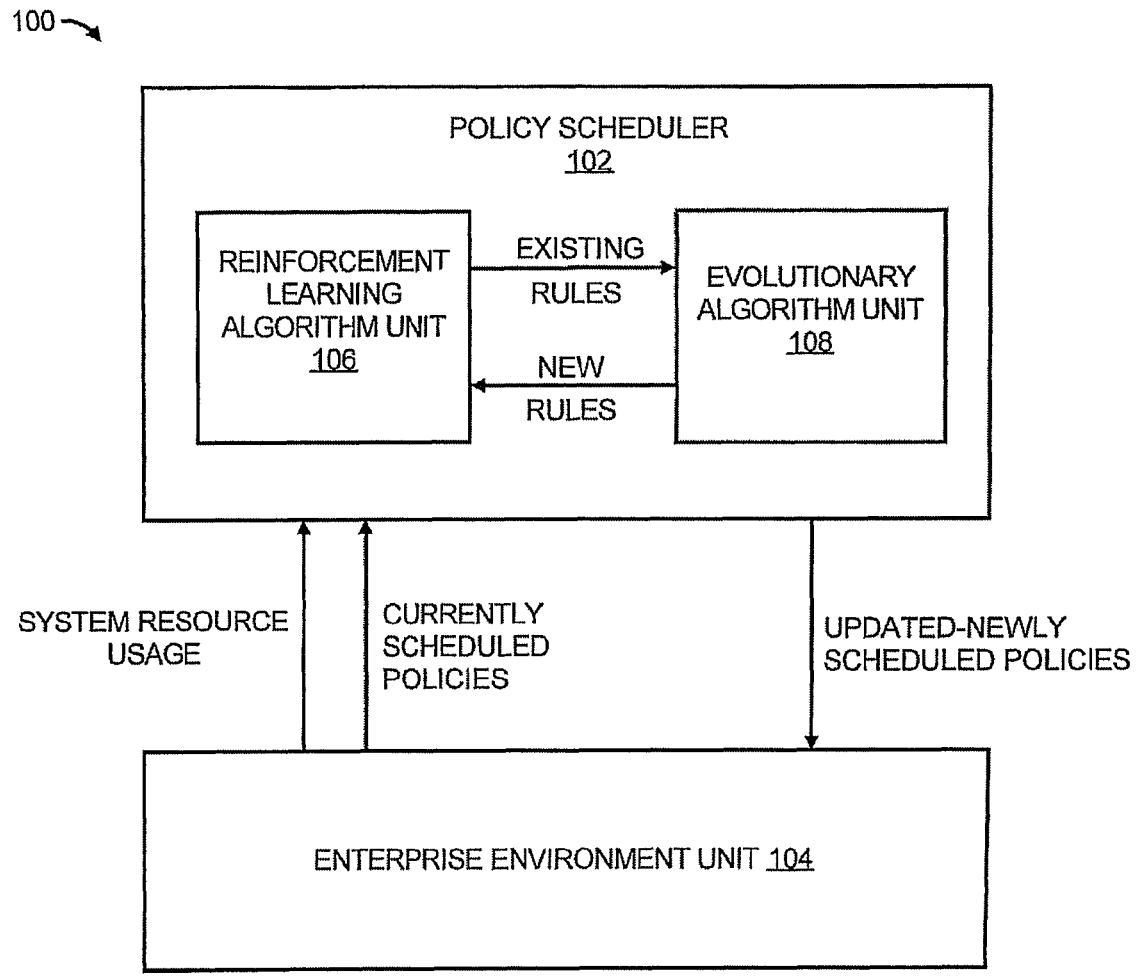
FIG. 1A shows a simplified block diagram of a system for scheduling policies, according to an embodiment of the present invention.

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are a system and method of scheduling policies that adaptively tunes a policy schedule according to a workload on a system. A policy is an entity, which performs one or more actions or functions, referred to as performances, such as monitoring system resources, applications, or a log file. The policy, for example, may be an application, subroutine, computer instructions, etc. When the policy is executed, the actions or functions of the policy are performed. A policy may be executed (i.e., performed) when conditions of a rule are matched with the conditions of the system resources. A Learning Classifier System (LCS) scheduler schedules when policies are to be performed. Scheduling a policy may include performing a policy currently or immediately, (e.g. when rule conditions are met) or scheduling a policy to perform at some time in the future (e.g., some time in the future after a determination that the rule conditions are met).

A rule includes one or more conditional checks or conditions for the system resources or for monitored data, such as central processing unit (CPU), memory, disk input/output (I/O). A rule may be provided in a rule-action pair. For example, when conditions of the rule are matched with the conditions of the system resources, the action of the rule-action pair is performed. An example of the action is scheduling a policy to run immediately or at a later time. The action may be a corresponding action for the rule. Thus, the action may be executed when the one or more conditions of the rule for the system resources are met. For example, a rule may be "if cpu_usage<=50% AND memory_usage<=55%" then an action may be "schedule policies, such as run backup or run batch report, to start execution at an interval difference of 'delta' seconds between each of them." When a policy is scheduled to be performed at an instant of time, the decision on whether immediate policy performance should start or not is influenced by the system resources usage or monitored data. The system usage data, such as CPU, memory, at the instant of time is compared with the rule part of rule-action pair and if the system usage data and the rule match then the action part of the rule-action pair is run. Examples of the action part of the rule-action pair include start, execution of the policies immediately or start execution of the policies with a delay of delta interval.

The LCS may evaluate a condition occurred on one or more resources of the system. Examples of the one or more resources of the system are a database, a web-server, a memory, an I/O unit, an operating system (OS), and a CPU.

A policy schedule is a schedule to execute one or more policies for a system, which may be an enterprise system. The policy scheduling helps ensure that there are minimal or no conflicts while evolving the policy schedule of the concerned policies. In an embodiment of the present invention, the system and method use the LCS to construct a constantly evolving, adaptive policy schedule that minimizes incidents of CPU spikes, memory spikes, and policy starvation.

The LCS is an evolutionary rule-based learning system. According to an embodiment, the LCS includes a set of rules, an evaluating component to evaluate the rules and to rate the rules according to a result of the evaluation, and an evolving component to evolve new rules. The rules are if-then rules, according to an example. The evaluating component may be implemented using reinforcement learning algorithms, such as an adaptive heuristic critic and a Q-learning. The evolving component may be implemented using evolutionary algorithms, such as a genetic algorithm.

With reference first to FIG. 1A, there is shown a simplified schematic diagram of a system 100 for scheduling policies that adaptively tunes a policy schedule according to a workload on a system, according to an embodiment of the present invention. It should be understood that the system 100 may include additional elements and that some of the elements described herein may be removed and/or modified without departing from the scope of the system 100.

The system 100 includes a policy scheduler 102, which may comprise software, firmware, and/or hardware and monitors and captures events from an enterprise environment unit 104. A unit may be hardware, software, and a combination. The enterprise environment unit 104 sends feedback of a system resource usage, such as a CPU usage, a memory usage, and an I/O usage to the policy scheduler 102. The enterprise environment unit 104 may further include a management repository unit, a configuration repository unit, an operation agent unit, and a system applications monitoring unit, as discussed in detail herein below. When an event captured from the enterprise environment unit 104 is matched with a set of rules, an appropriate rule is selected and its corresponding action is executed.

The policy scheduler 102 includes a reinforcement learning algorithm unit 106 and an evolutionary algorithm unit 108. The reinforcement learning algorithm unit 106 runs a reinforcement learning algorithm. The reinforcement learning algorithm unit 106 acts on the feedback from the enterprise environment unit 104, and the rules given a positive credit or a negative credit based on the consequence of the corresponding action on the enterprise environment unit 104 or system resources. For example, positive credits may be assigned to the rules if the current state of the system is in compliance with the rules. For example, the current state of the system is in compliance with a rule if the current state of the system, such as the current CPU usage satisfies the conditions specified by the rule. For further example, if the current CPU usage is 80 percent and a condition specified by the rule is CPU usage less than 90 percent, then the current state of the system (CPU usage) is in compliance with the rule. In addition, negative credits may be assigned to the rules if the current state of the system is not in compliance with the rules. The reinforcement learning algorithm unit 106 monitors and retains superior rules, based on the positive credit given to the rules while at the same time weeds out inferior rules based on the negative credit given to the rules. Thus, the reinforcement learning algorithm is a process used to evaluate the positive or negative credit given to the rules based on feedback from the enterprise environment unit 104 (e.g., system state feedback including system metrics).

The evolutionary algorithm unit 108 runs an evolutionary algorithm. The evolutionary algorithm evolves new rules from the existing rules. Under the evolutionary algorithm, new rules may be generated by operations, such as a crossover and a mutation. The crossover is an operation used to vary the existing rules. For example, the crossover operation may interchange or swap one or more conditions of different rules. The crossover operation may be performed by arbitrary selecting different rules and swapping different conditions of different rules to create a new rule that may include conditions came from different rules. The mutation is an operation used to diversify the existing rules. For example, the mutation operation may alter one or more conditions of the existing rule. These new rules generated by the evolutionary algorithm are added to the pool of existing rules and may start competing with the existing rules. Therefore, the policy scheduler 102 is in a constant state of evolution and the system 100 is able to adapt to any environment as the system promotes superior rules while weeding out the inefficient rules. Thus, the system 100 may sense the characteristics of the underlying environment and act appropriately instead of being programmed to behave in a specified manner.

The policy scheduler 102 is configured to communicate with the enterprise environment unit 104. In addition, the policy scheduler 102 periodically updates scheduling using a snapshot of a system workload and a planned schedule of the policies. For example, the policy scheduler 102 evolves a new policy schedule for the policy execution when it is considered necessary based on the current policy schedule and the dynamic system usage. The new policy schedule is then sent to the enterprise environment unit 104 for execution. The enterprise environment unit 104 creates feedback for the new policy schedule. The feedback from the enterprise environment unit 104 for the new policy schedule may include a policy schedule that may be preferred and adopted for the system 100.

The policy scheduler 102 generates a policy schedule using at least two factors. The first factor is a current state of the system 100. The information of the current state of the system 100 comprises, but is not limited to, a CPU usage, a memory usage, an input/output (I/O) usage, policies currently executing, and policies scheduled to execute. The information of the current state of the system 100 may be located in management data stored in a management repository unit, which is described in greater detail herein below with respect to FIG. 1B. Various system application monitoring tools present on the system 100 may capture the information of the current state of the system 100, and log the information of the current state of the system 100 into the management repository unit. Therefore, the policy scheduler 102 may obtain the snapshot of the system workload at any given time.

The second factor is an execution behavior of the policies. The information related to the execution behavior of policies, such as scheduled timings, execution interval of the policies, and relative order of execution, may be obtained from a configuration repository unit, which is described in greater detail herein below with respect to FIG. 1B. An actual execution of the policies may not directly map onto a planned schedule, therefore there may be a need to capture information of the actual execution of the policies. For example, the planned schedule may specify an anticipated start time and an anticipated end time of individual policies. The information of the actual execution of the policy may be obtained from different sources. One way to obtain the information of the actual execution of the policy would be to access the information from an agent log, which may contain an execution start time and an execution end time of individual policies. With this information, the necessary details needed to assess the execution interval of the policies at various system workloads may be available.

Figure 1B:
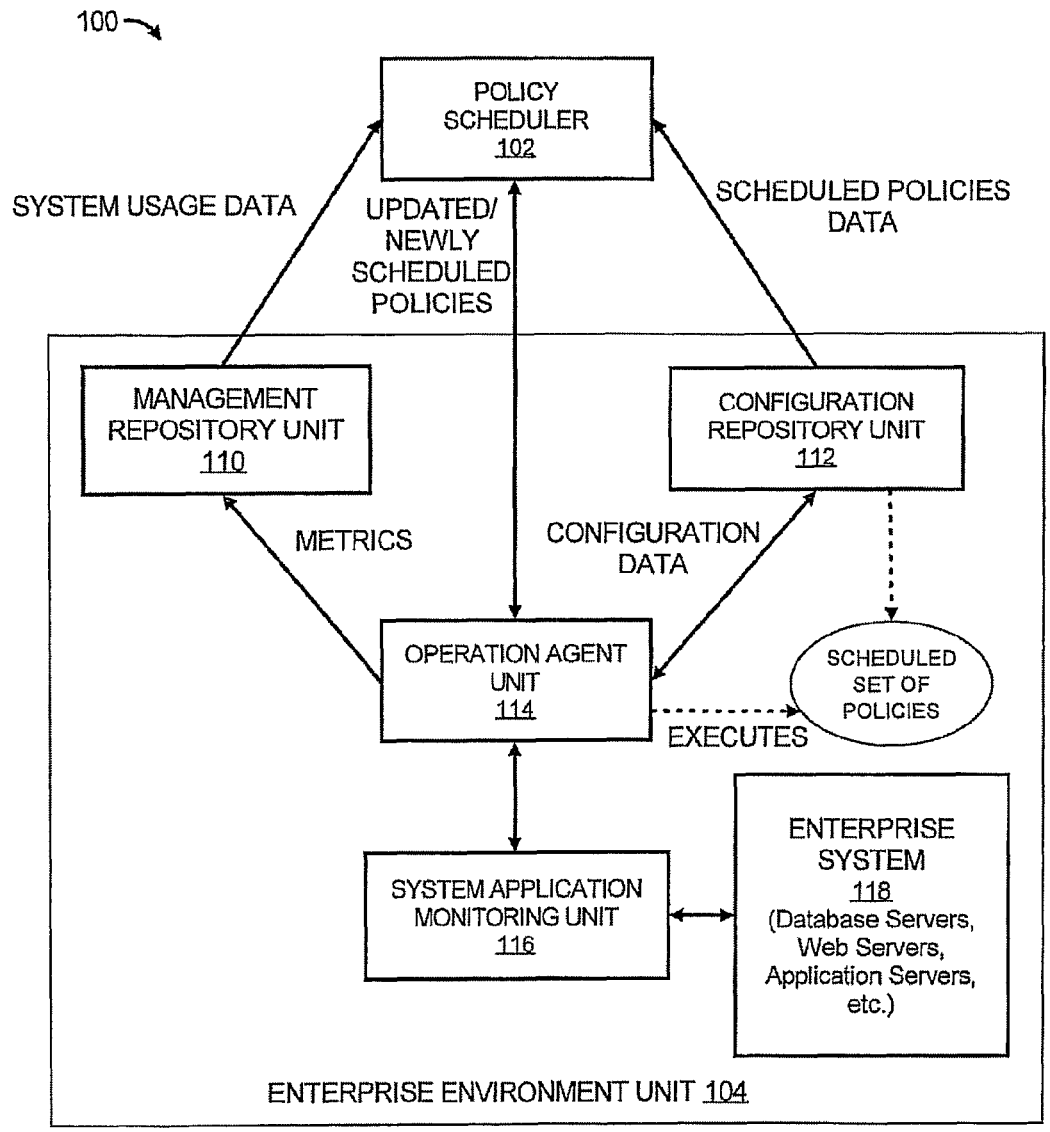
FIG. 1B shows a more detailed block diagram of the system depicted in FIG. 1A, according to an embodiment of the invention.

Turning now to FIG. 1B, there is shown a more detailed schematic diagram of the system 100, according to an embodiment of the present invention. As shown in FIG. 1B, the enterprise environment unit 104 is depicted as further including a management repository unit 110, a configuration repository unit 112, an operation agent unit 114, a system application monitoring unit 116, and an enterprise system 118. The units 110-116 are designed to perform various functions in the enterprise environment unit 104 by communicating with the policy scheduler 102. The enterprise environment unit 104 monitors resources regarding policy schedule processes and system applications. Example of the resources may be servers, CPUs, memory, I/O, bandwidth, etc.

The enterprise system 118 support the enterprise environment unit 104 by providing system applications and resources, such as servers, CPUs, memory, I/O, bandwidth, etc. The enterprise system 118 may further include database servers, web servers, application servers, etc.

In instances where the policy scheduler 102 and the enterprise environment unit 104 comprise software, the policy scheduler 102 and the enterprise environment unit 104 may be stored on a computer readable storage medium and may be executed or implemented by a processor. In these instances, the units 106-116 may comprise software modules or other programs or algorithms configured to perform the functions described herein below. In instances where the policy scheduler 102 and the enterprise environment unit 104 comprise firmware and/or hardware, the policy scheduler 102 and the enterprise environment unit 104 may comprise a circuit or other apparatus configured to perform the functions described herein below. In these instances, the units 106-116 may comprise one or more of software modules and hardware modules configured to perform these functions.

The management repository unit 110 serves as a repository for various management data generated by monitoring different system applications. The configuration repository unit 112 stores information related to various policies used within the system 100. The operation agent unit 114 executes the various policies as policy processes based on the information contained in the configuration repository unit 112. The policy scheduler 102 periodically extracts policy specific data, such as policies currently executing and policies scheduled to execute, from the configuration repository unit 112, and extracts system usage data, such as CPU usage data, memory usage data, and input/output (I/O) usage data, from the management repository unit 110. The policy scheduler 102 further evolves a new schedule for the policies based on the current policy specific data and the system usage data, and then to send the newly scheduled policies to the operation agent unit 114 for execution. The system application monitoring unit 116 monitors one or more system applications to generate the various management data.

Figure 2:
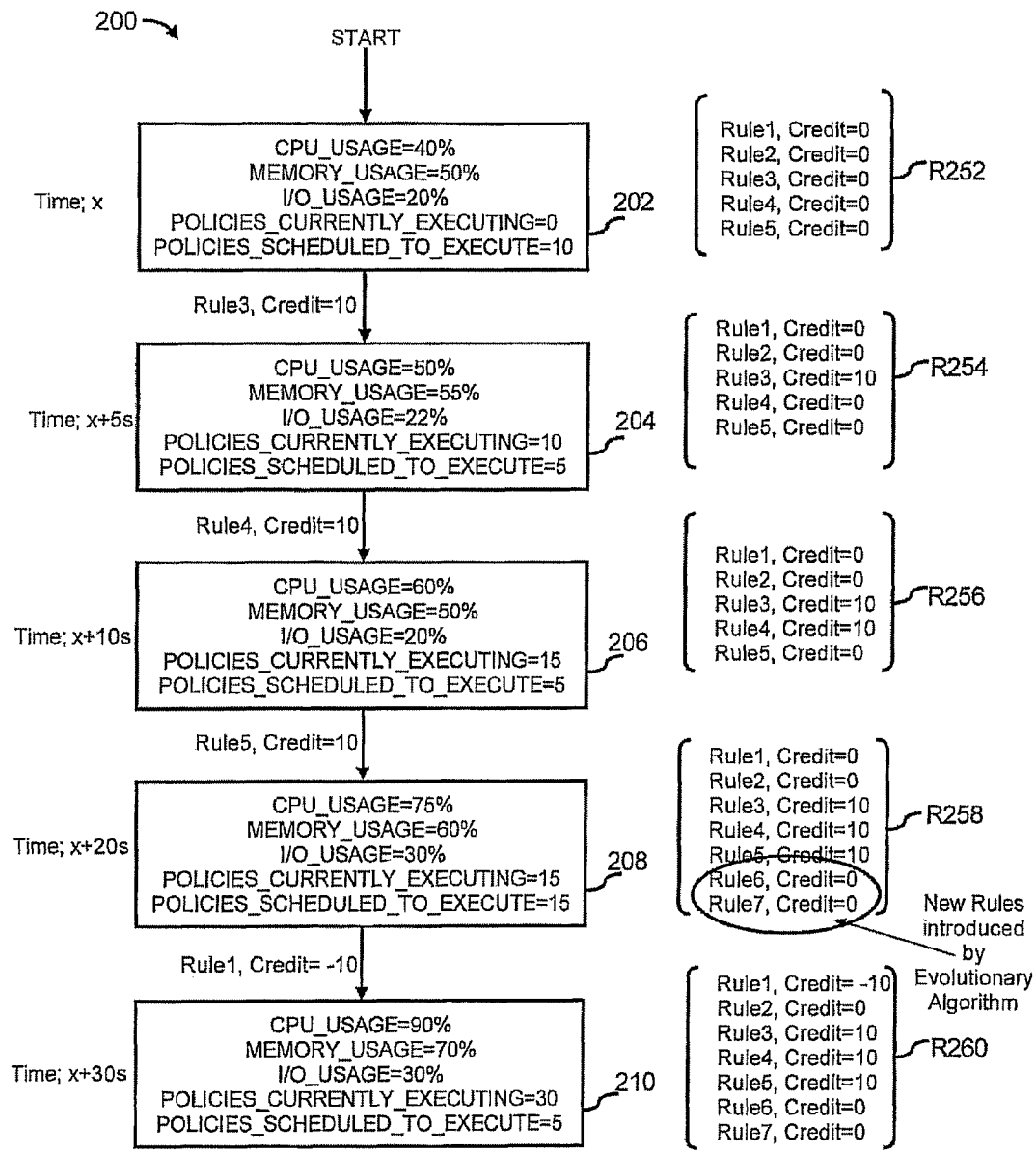
FIG. 2 illustrates a flow diagram of method of evolving a new rule while evaluating a rule at various instances of time to schedule policies, according to an embodiment of the present invention.

An example of an application of methods in which the system 100 may be employed to schedule policies that can adaptively tune a policy schedule according to a workload on a system will now be provided with particular reference to FIG. 2. FIG. 2 illustrates a flow diagram of method 200 of evolving a new rule while evaluating an existing rule at various instances of time by the policy scheduler 102, according to an embodiment of the present invention. In this example, the interaction between the policy scheduler 102 and the enterprise environment unit 104 is described. The followings are the terms used for describing the various aspects of the enterprise environment unit 104.

In FIG. 2, the terms, cpu_usage, memory_usage, and I/O_usage represent the corresponding usage statistics of the stated resources, such as CPU, memory, and I/O, respectively. These statistics about system usage data is obtained from the management repository unit 110. The term, policies_currently_executing indicates number of policies currently being executed on the system, and this information is obtained from the configuration repository unit 112. The term, policies_scheduled_to_execute indicates number of policies that are scheduled to be executed on the system, and this information is obtained from the configuration repository unit 112. The term, credit indicates a positive credit or a negative credit that is imposed on a rule corresponding to the behavior of the system. For simplicity, an arbitrary integer value may be considered for the credit. For example, a positive integer value may be assigned for the positive credit and a negative integer value may be assigned for the negative credit. In this particular example, values are incremented with an interval of 10. Examples of the rules are if-conditions as below.

Rule3: IF [cpu_usage<=40% AND memory_usage<=50% AND policies_currently_executing=0 AND policies_scheduled_to_execute<=0] THEN schedule policies to start execution at an interval difference of 'delta' seconds between each of them where delta at this time is 0 ENDIF.

Rule4: IF [cpu_usage<=50% AND memory_usage<=55% AND policies_currently_executing<=10 AND policies_scheduled_to_execute<=10] THEN schedule policies to start execution at an interval difference of 'delta' seconds between each of them where delta at this time is 0 ENDIF.

Rule5: IF [cpu_usage<=60% AND memory_usage<=65% AND policies_currently_executing<=20 AND policies_scheduled_to_execute<=5] THEN schedule policies to start execution at an interval difference of 'delta' seconds between each of them where delta at this time is 0 ENDIF.

In FIG. 2, at time x+20 s, the rules, Rule3, Rule4, and Rule5 have been evaluated. Positive feedback from the system qualifies the rules to be utilized by the evolutionary algorithm to generate one or more new rules. The evolutionary algorithm unit 108 generates one or more new rules from the existing set of rules. According to an example, applying the crossover operation on the existing set of rules, Rule3 and Rule4, may result in a new rule, Rule6.

Rule6: IF [cpu_usage<=40% AND memory_usage<=55% AND policies_currently_executing<=10 AND policies_scheduled_to_execute<=10] THEN schedule policies to start execution at an interval difference of 'delta' seconds between each of them where delta at this time is 0 ENDIF.

According to another example, the crossover operation on Rule4 and Rule5 followed by the mutation operation on the new rule, Rule6 may result in another new rule, Rule7.

Rule7: IF [cpu_usage<=55% AND memory_usage=65% AND policies_currently_executing<=15 AND policies_scheduled_to_execute<=5] THEN schedule policies to start execution at an interval difference of 'delta' seconds between each of them where delta at this time is 0 ENDIF.

In FIG. 2, at step 202, starting at time x, five (5) rules having zero credits for all five rules (R252) are initially considered within the system 100. Each rule has its credit value of zero (0) since no rule has been evaluated at time x. At time x, resource usage data and policy schedule data favor the conditions of Rule3. Thus, applying Rule3's action, which starts execution of policies with schedule time x on the system 100, and moves the system 100 to the next step, step 204 (at time x+5 s). Since the state at step 202 is a state with no peak loads on the system 100, Rule3 gets a positive credit of 10 points.

At step 204, starting at time x+5 s, there are still five (5) rules (R254) within the system 100. Each rule has its credit value of zero (0) except Rule3, which has its credit value of ten (10) since only Rule3 has been evaluated. At time x+5 s, the resource usage data and the policy schedule data favor the conditions of Rule4. Thus, applying Rule4's action, which moves the system to the next step, step 206 (at time x+10 s). Since the state at step 204 is a state with no peak loads on the system 100, Rule4 gets a positive credit of 10 points.

At step 206, starting at time x+10 s, there are still five (5) rules (R256) within the system 100. Each rule has its credit value of zero (0) except Rule3 and Rule4, each has its credit value of ten (10) since Rule3 and Rule4 have been evaluated. At time x+10 s, the resource usage data and the policy schedule data favor the conditions of Rule5. Thus, applying Rule5's action, which moves the system to the next step, step 208 (at time x+20 s). Since the state at step 206 is a state with no peak loads on the system 100, Rule5 gets a positive credit of 10 points.

At step 208, starting at time x+20 s, there are seven (7) rules (R258) within the system 100. At time x+20 s, the evolutionary algorithm unit 108 introduces new rules, Rule6 and Rule7, into the system 100 by running an evolutionary algorithm using a crossover operation and a mutation operation. Adding the new rules, Rule6 and Rule7, into the system 100 moves the system to the next step, step 210 (at time x+30 s).

At step 210, starting at time x+30 s, there are seven (7) rules (R260) within the system 100. At time x+30 s, application of Rule1 deteriorates the system state by causing CPU/Memory spikes as the process continues. This causes the policy scheduler 102 to impose a negative credit of −10 points on Rule1. This way the system 100 moves from one state to the next state as the rules are tested against the resource usage data and the policy schedule data. Periodically, the evolutionary algorithm unit 108 introduces one or more new rules into the system 100 by running an evolutionary algorithm while the reinforcement learning algorithm unit 106 repeats the reinforcement learning algorithm, such as step 202 through step 210.

The management repository unit 110 and the configuration repository unit 112 provide the necessary information needed to arrive at the 'delta' interval that is used in evolving the policy schedule. Typically, a set of policies are executed repeatedly based on their schedules. Thus, the behavior (execution duration, start time, end time, etc.) of the policies over a period and at different system loads may be observed. Using this data based on the behavior of the policies over a period and at different system loads, obtaining a suitable delta value that may result in optimal policy execution behavior is feasible. For example, a delta value that brings an execution start interval between two policies.

Different approaches may be defined to facilitate interaction between the policy scheduler 102 and the management repository unit 110, and the configuration repository unit 112. In one embodiment, a simple message passing method using bit strings may be used. Each message is a string sequence of bits, and each bit indicates a validity of one or more conditions in a rule. The mapping between the one or more conditions in a rule and bit positions is stored within the local repository units, such as the management repository unit 110 and the configuration repository unit 112. Thus, for every rule within the system, there is a corresponding bit string pattern. The information obtained from various sources are converted into a bit string and compared with a bit string associated with different rules using an appropriate comparator defined in the system. Upon obtaining a set of matching rules, a rule or a set of rules that have maximum positive credit value may be selected and its action, such as evolving and running one or more policies, may be executed on the system.

Figure 3:
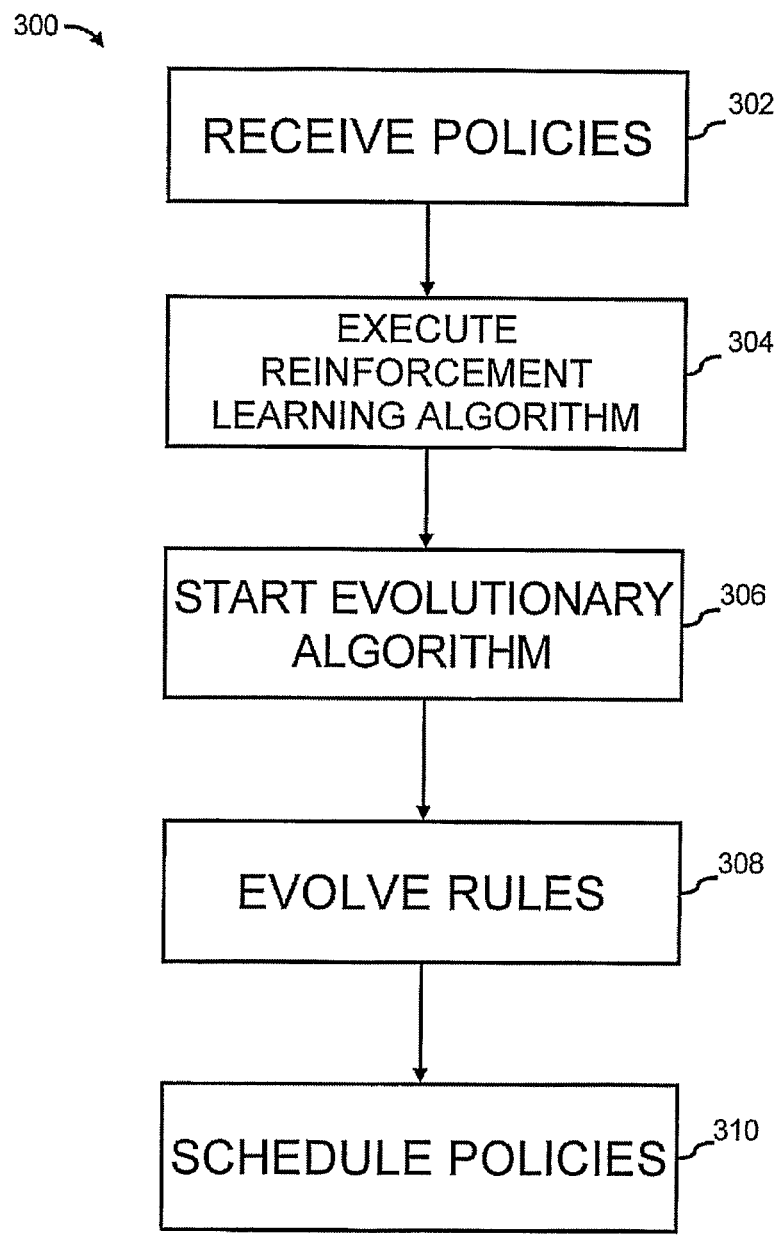
FIG. 3 illustrates a flow diagram of a method of scheduling policies, according to an embodiment of the present invention.

An example of a method in which the system 100 may be employed to schedule policies that adaptively tunes a policy schedule according to a workload on a system will now be described with respect to the following flow diagram of the method 300 depicted in FIG. 3, according to an embodiment of the present invention. It should be apparent to those of ordinary skill in the art that the method 300 represents generalized illustrations and that other steps may be added or existing steps may be removed, modified or rearranged without departing from the scopes of the method 300.

The descriptions of the method 300 are made with reference to the systems 100 illustrated in FIGS. 1A and 1B, and thus makes reference to the elements cited therein. It should, however, be understood that the method 300 is not limited to the elements set forth in the systems 100. Instead, it should be understood that the method 300 may be practiced by a system having a different configuration than that set forth in the systems 100.

A controller, such as a processor (not shown), may implement or execute the policy scheduler 102 to perform one or more of the steps described in the method 300 in scheduling policies that adaptively tunes a policy schedule according to a workload on a system.

At step 302, a set of policies is received at the policy scheduler 102. The set of policies is received for a system and information of a current state of the system. The set of policies may be received from a system administrator or from the enterprise system 118. As described above, a policy is executed when conditions set by a rule meets the current state of resources of the system. Thus, scheduling the policy is based on an evaluation of a state of resources of the system.

At step 304, a reinforcement learning algorithm is executed at the policy scheduler 102. As discussed above, the reinforcement learning algorithm is executed by the reinforcement learning algorithm unit 106. The reinforcement learning algorithm acts on feedback from the enterprise environment unit 104 and assigns positive credits or negative credits to the rules based on the consequence of the corresponding action on the enterprise environment unit 104. For example, if the action is to schedule a policy to execute and the policy is executed, it may cause increased CPU usage, then negative credit may be assigned to the rule. Here, the increased CPU usage is the feedback. The reinforcement learning algorithm unit 106 may determine whether performing the scheduled policy causes the state of resources of the system to exceed a predetermined threshold when the reinforcement learning algorithm assigns positive credits or negative credits to the rules. For example, if the threshold is CPU usage of 80 percent (%) then a negative credit may be assigned to the rule when the action part of the rule is to schedule a policy and the execution of the policy causes increased CPU usage greater than 80 percent. The reinforcement learning algorithm unit 106 further prioritizes the plurality of rules based on a value of the positive credits and a value of the negative credits of each of the plurality of rules and thus, schedules the set of policies based on the prioritization of the plurality of rules. For example, the highest priority rule may have the highest value of the positive credits and the lowest priority rule may have the highest value of the negative credits. The highest priority rules may be evaluated first to determine whether to perform their actions. A lower priority rule may be evaluated later or not evaluated at all.

At step 306, an evolutionary algorithm is triggered to generate one or more new rules based on the information of the current state of the system and the evaluation of the rules. As described above, the evolutionary algorithm may include a crossover operation and a mutation operation.

At step 308, after the one or more new rules generated at step 306 is added to the plurality of existing rules, the rules, which now includes the newly generated rules are prioritized again according to the credits. Thus, at step 308, rules are evolved via the reinforcement learning algorithm as well as the evolutionary algorithm that already have been triggered at steps 304 and 306.

At step 310, the set of policies is being scheduled while repeating the reinforcement learning algorithm and the evolutionary algorithm.

Figure 4:
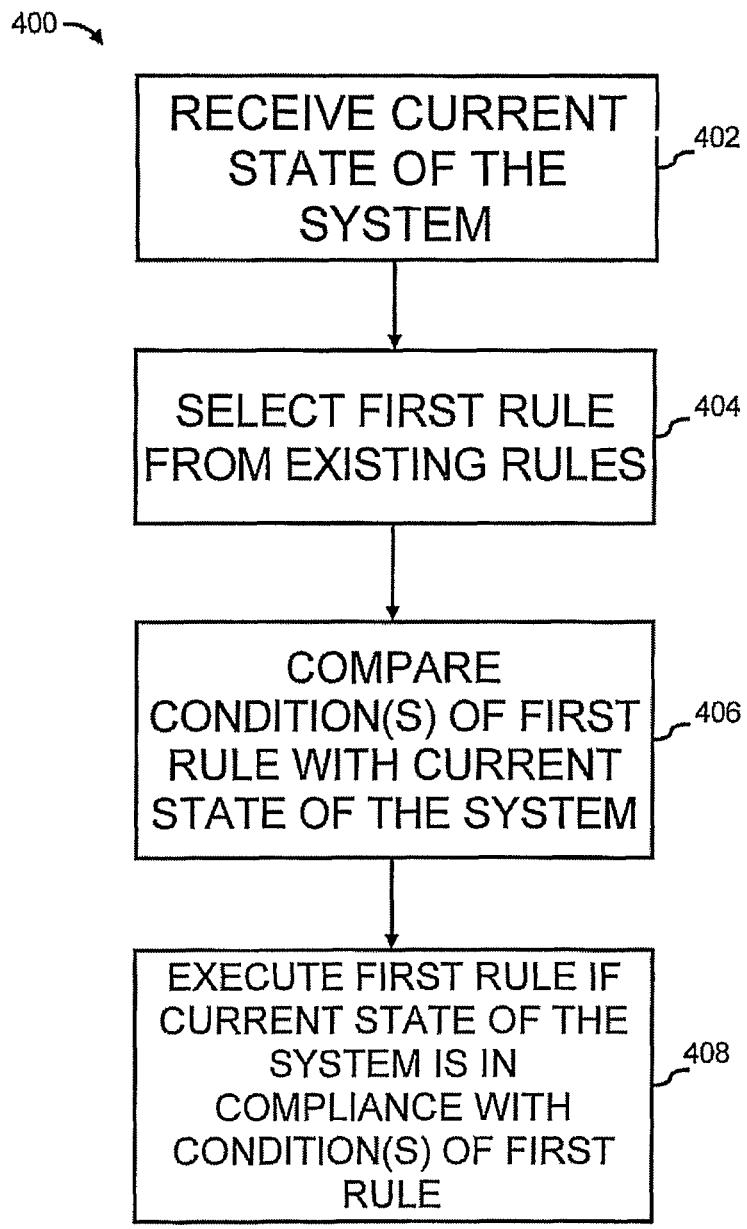
FIG. 4 illustrates a flow diagram of a method of evaluating a rule, according to an embodiment of the present invention.

With particular reference to FIG. 4, there is shown a flow diagram of a method 400 for evaluating one or more rules using the reinforcement learning algorithm shown in method 300, according to an embodiment of the present invention.

A controller, such as a processor, may implement or execute the reinforcement learning algorithm unit 106 to perform one or more of the steps described in the method 400 in evaluating one or more rules.

At step 402, information of a current state of the system 100 is received. Information of the current state of the system 100 includes information of the current state of one or more resources in the system 100. Examples of the state of one or more resources of the system 100 are a database usage, a memory usage, an I/O usage, an OS usage, and a CPU usage.

At step 404, a first rule is selected from the existing rules. The selection of the first rule may be an arbitrary selection. In addition, the first rule may be selected based on predetermined rule selection criteria, such as a value of the credit belongs to a rule.

At step 406, one or more conditions of the selected first rule is compared with the information of the current state of one or more resources in the system 100. Step 406 determines whether the information of the current state of one or more resources in the system 100 is in compliance with one or more conditions of the first rule by the comparison.

At step 408, the selected first rule is executed if the information of the current state of one or more resources in the system 100 is in compliance with the one or more conditions of the first rule. As described above, the current state of the system is in compliance with a rule if the current state of the system, such as the current CPU usage satisfies the conditions specified by the rule.

Figure 5:
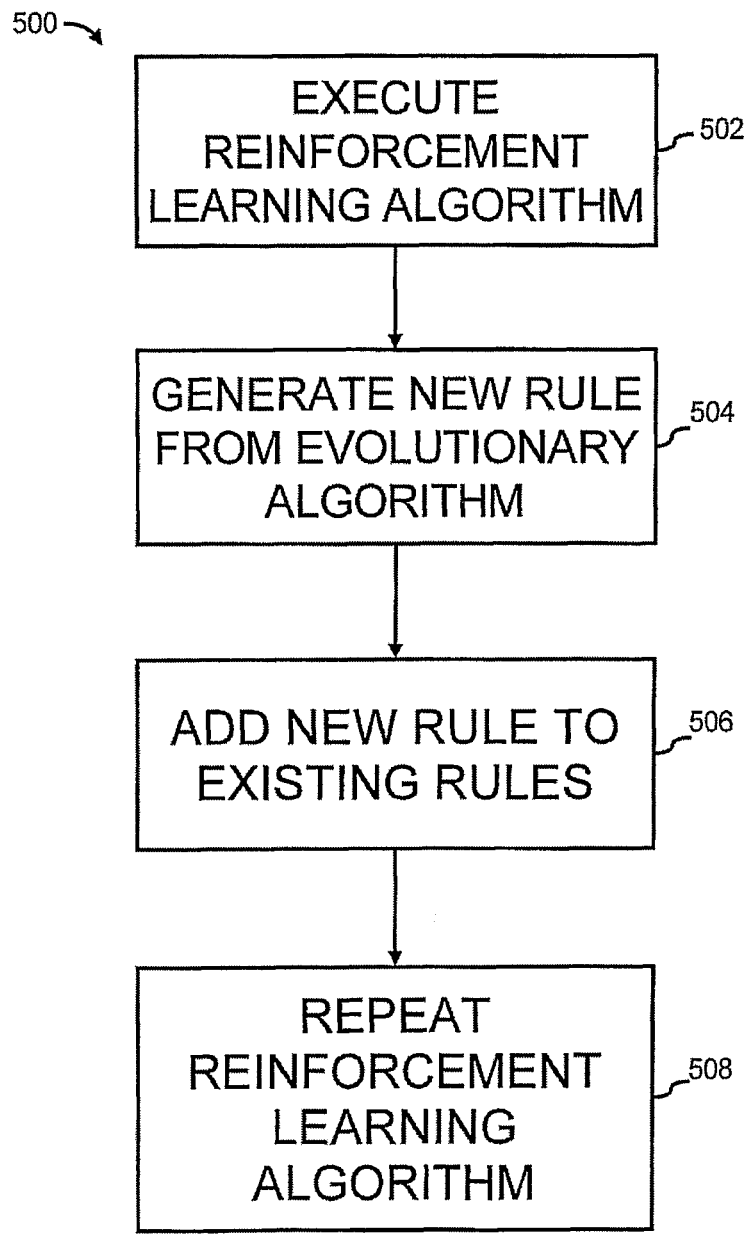
FIG. 5 illustrates a flow diagram of method of evolving a rule, according to an embodiment of the present invention.

With particular reference to FIG. 5, there is shown a flow diagram of a method 500 for evolving one or more rules using the reinforcement learning algorithm and the evolutionary algorithm shown in method 300, according to an embodiment of the present invention.

A controller, such as a processor, may implement or execute the reinforcement learning algorithm unit 106 and the evolutionary algorithm unit 108 to perform one or more of the steps described in the method 500 in evolving one or more rules.

At step 502, a reinforcement learning algorithm is executed at the policy scheduler 102 to evaluate existing rules.

At step 504, a new rule is generated by executing the evolutionary algorithm. The new rule may be generated using the crossover and the mutation operations.

At step 506, the newly generated rule is added into the existing rules and the newly generated rule competes with the existing rules by evaluating the newly generated rule.

At step 508, the reinforcement learning algorithm is repeated. The reinforcement learning algorithm may be repeated for predetermined intervals for scheduling and executing policies.

Some or all of the operations set forth in the methods 200, 300, 400, and 500 may be contained as a utility, program, or subprogram, in any desired computer accessible medium. In addition, the methods 200, 300, 400, and 500 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
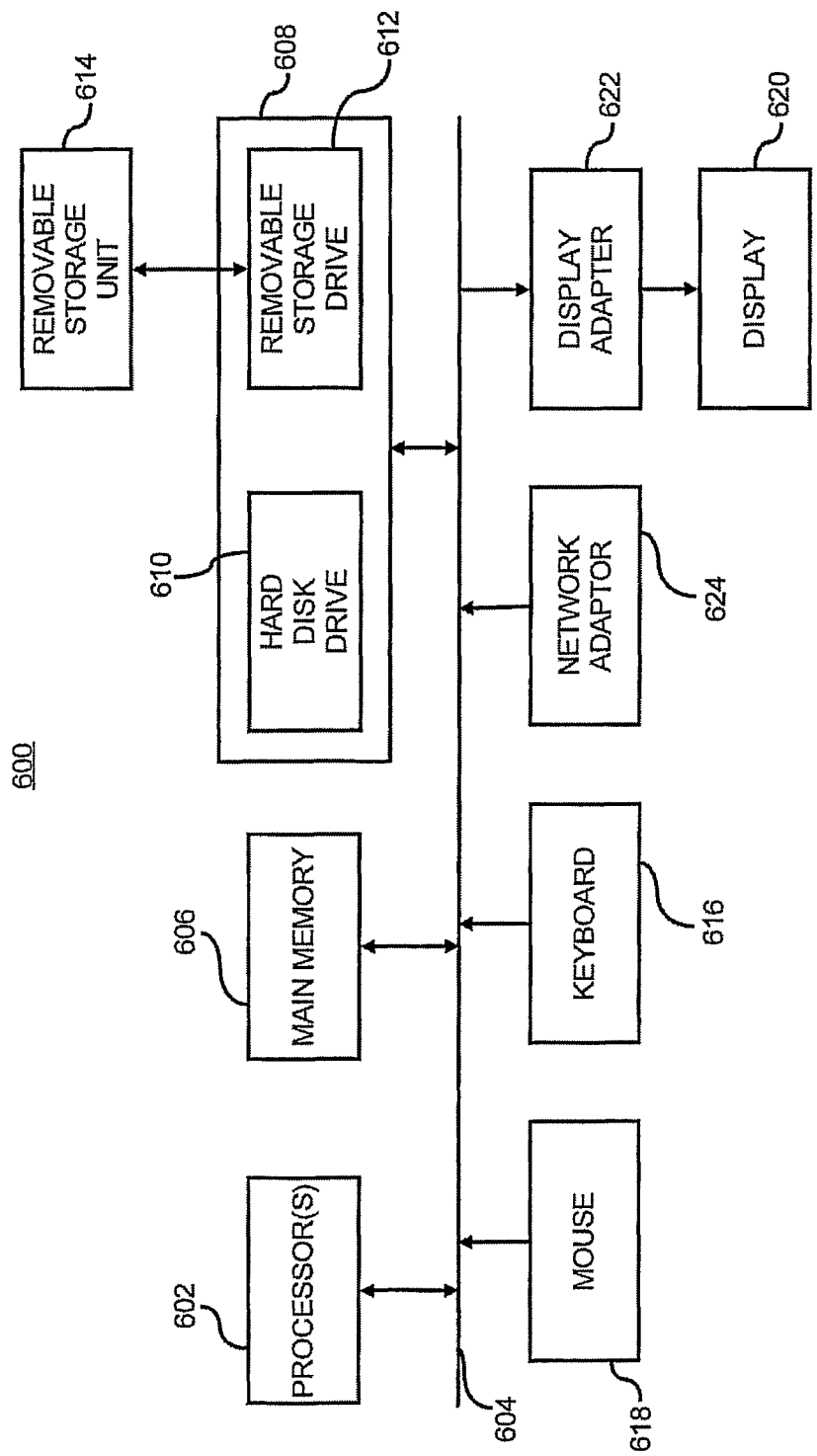
FIG. 6 shows a block diagram of a computing apparatus configured to implement a policy scheduler, according to an embodiment of the present invention.

FIG. 6 illustrates a block diagram of a computing apparatus 600 configured to implement or execute the policy scheduler 102 depicted in FIGS. 1A and 1B, according to an example. In this respect, the computing apparatus 600 may be used as a platform for executing one or more of the functions described hereinabove with respect to the policy scheduler 102.

The computing apparatus 600 includes a processor 602 that may implement or execute some or all of the steps described in the methods 200, 300, 400, and 500. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for the methods 200, 300, 400, and 500 may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

It will be apparent to one of ordinary skill in the art that other known electronic components may be added or substituted in the computing apparatus 600. It should also be apparent that one or more of the components depicted in FIG. 6 may be added or removed (for instance, user input devices, secondary memory, etc.).

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. At least one non-transitory computer readable storage device including instructions that, when executed, cause a computer to perform a method, the method comprising:
the computer receiving a plurality of rules for a system and information of a current state of the system and a schedule of an action for the system based on a prioritization of the plurality of rules;
the computer evaluating the plurality of rules based on the current state of the system and determining whether the current state of the system is in compliance with the plurality of rules;
after an evaluation of each of the plurality of rules, assigning a positive credit to the evaluated rule if the current state of the system is in compliance with the evaluated rule, and assigning a negative credit to the evaluated rule if the current state of the system is not in compliance with the evaluated rule;
after the credits have been assigned to the plurality of rules, updating the prioritization of the plurality of rules based on the credits of the plurality of rules; and
scheduling an execution of an action for the system based on the updated prioritization of the rules.

2. The at least one computer readable storage device of claim 1, the method further comprising repeating evaluating the plurality of rules within a predetermined time interval.

3. The at least one computer readable storage device of claim 1, further comprising:
generating a new rule using an evolutionary algorithm based on the information of the current state of the system; and
adding the newly generated rule to the plurality of rules.

4. The at least one computer readable storage device of claim 1, wherein evaluating the plurality of rules comprises:
comparing a condition of one of the plurality of rules with the information of the current state of the system;
determining if the current state of the system is in compliance with the rule by determining if a current usage of resources by the system is less than a threshold specified in the condition of the rule; and
executing the rule if the current state of the system is in compliance with the rule.

5. The at least one computer readable storage device of claim 1, wherein scheduling the further execution of the action comprises:
updating the scheduling of the execution of the action based on information of the positive credit and the negative credit of the plurality of rules.

6. The at least one computer readable storage device of claim 1, wherein assigning the positive credit to the evaluated rule further comprises:
determining whether performing the scheduled execution of the action causes the current state of the system to exceed a predetermined threshold.

7. The at least one computer readable storage device of claim 4, wherein the condition of the rule corresponds to one or more conditions of the current state of the system.

8. The at least one computer readable storage device of claim 3, wherein the evolutionary algorithm comprises a crossover operation and a mutation operation.

9. The at least one computer readable storage device of claim 8, wherein the crossover operation interchanges one or more conditions of different rules in the plurality of rules.

10. A policy scheduling system comprising:
a policy scheduler to
receive information of a current state of the system and a schedule of an action for the system based on a prioritization of the plurality of rules,
evaluate a plurality of rules based on the current state of the system and determine whether the current state of the system is in compliance with the plurality of rules,
assign a positive credit to the evaluated rule if the current state of the system is in compliance with the evaluated rule, and assign a negative credit to the evaluated rule if the current state of the system is not in compliance with the evaluated rule,
update the prioritization of the plurality of rules based on the credits of the plurality of rules, and
schedule an execution of a policy for the system based on the updated prioritization of the plurality of rules;
a management repository unit to contain management data generated by monitoring system applications, wherein the management data includes resource usage data;
a configuration repository unit to contain information related to the plurality of rules;
an operation agent unit to execute the policy;
a system application monitoring unit to monitor a system application of the system to generate the management data; and
a processor to implement the policy scheduler.

11. The policy scheduling system of claim 10, wherein the policy scheduler is further to communicate with the management repository unit to transfer the management data, and to communicate with the configuration repository unit to transfer the information related to the plurality of rules, and to communicate with the operation agent unit to update the plurality of rules.

12. The policy scheduling system of claim 10, wherein the policy scheduler further comprises:
an evolutionary algorithm unit to generate a new rule using an evolutionary algorithm.

13. The policy scheduling system of claim 12, wherein the policy scheduler is further to add the newly generated rule to the plurality of rules, and to repeatedly run a reinforcement learning algorithm within a predetermined time interval to evaluate the plurality of rules including the newly generated rule.

14. The policy scheduling system of claim 10, wherein, to evaluate the plurality of rules, the policy scheduler is to
compare a condition of one of the plurality of rules with the information of the current state of the system;
determine if the current state of the system is in compliance with the rule, including determine if a current usage of resources by the system is less than a threshold specified in the condition of the rule; and
execute the rule if the current state of the system is in compliance with the rule.

15. The policy scheduling system of claim 12, wherein the policy scheduler is to trigger the evolutionary algorithm based on the information of the current state of the system.

16. The policy scheduling system of claim 10, wherein the policy scheduler is further to update the schedule of the execution of the policy based on information of the positive credit and the negative credit of the plurality of rules using a reinforcement learning algorithm for the plurality of rules.

17. The policy scheduling system of claim 10, wherein the policy scheduler is further to determine whether performing the scheduled policy causes the current state of the system to exceed a predetermined threshold.

18. A policy scheduler comprising:
a processor to receive a plurality of rules and information of a current state of a system and a schedule of an action for the system based on a prioritization of the plurality of rules,
evaluate the plurality of rules based on the current state of the system and determine whether the current state of the system is in compliance with the plurality of rules,
after an evaluation of each of the plurality of rules, assign a positive credit to the evaluated rule if the current state of the system is in compliance with the evaluated rule, and assign a negative credit to the evaluated rule if the current state of the system is not in compliance with the evaluated rule,
update the prioritization of the plurality of rules based on the credits of the plurality of rules, and
schedule an execution of an action based on the updated prioritization of the plurality of rules;
an interface to receive the plurality of rules, the information of the current state of the system, and the updated prioritization; and
a data storage storing the plurality of rules, the information of the current state of the system and the updated prioritization.

* * * * *